Aug. 22, 1933.   G. G. ROCKWELL   1,923,799
BEARING CONSTRUCTION
Filed Nov. 9, 1928

George G. Rockwell
INVENTOR
BY Robert S. Blair
ATTORNEY

Patented Aug. 22, 1933

1,923,799

UNITED STATES PATENT OFFICE 1,923,799

BEARING CONSTRUCTION

George G. Rockwell, Danbury, Conn., assignor to The Ball & Roller Bearing Company, Danbury, Conn., a Corporation of Connecticut Application November 9, 1928. Serial No. 318,231

9 Claims. (Cl. 29—148.4)

This invention relates to the construction of anti-friction bearings and methods of making the same but more particularly to the roller type.

The primary objects of the invention are to provide a practical device of this character which is efficient and dependable in action and which may be economically produced. Further important objects are to provide a simple and effective device for holding a complement of rolls so that they may be slipped into a bearing as a unit, to provide an efficient device for maintaining the rolls in proper position within the bearing in action and in general to provide an improved roller bearing. Other objects will be in part obvious and in part pointed out hereinafter.

The invention accordingly consists in the features of construction, combination of elements, arrangement of the parts, and in the several steps and relation and order of the same, all as will be illustratively herein described and the scope of the application of which will be indicated in the following claims.

In the accompanying drawing, in which are shown the mechanical features of one of various possible embodiments of this invention, Fig. 1 is a sectional elevation taken substantially on the line 1—1 of Fig. 2;

Similar reference characters refer to similar parts throughout the drawing.

Figure 1:
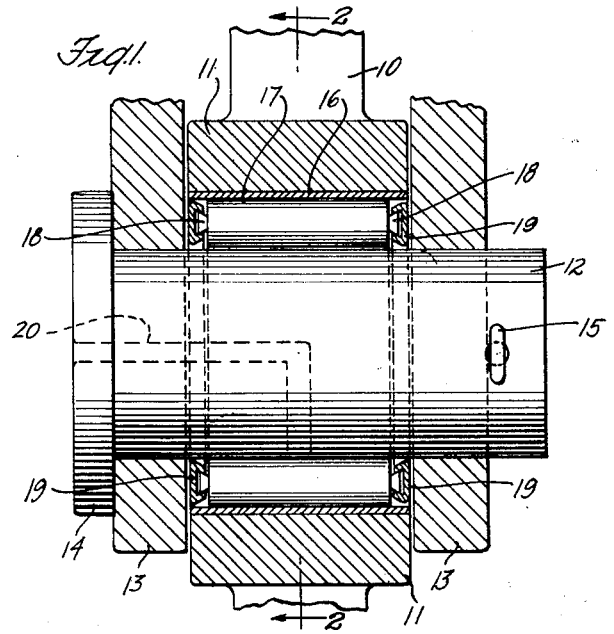
Figure 2:
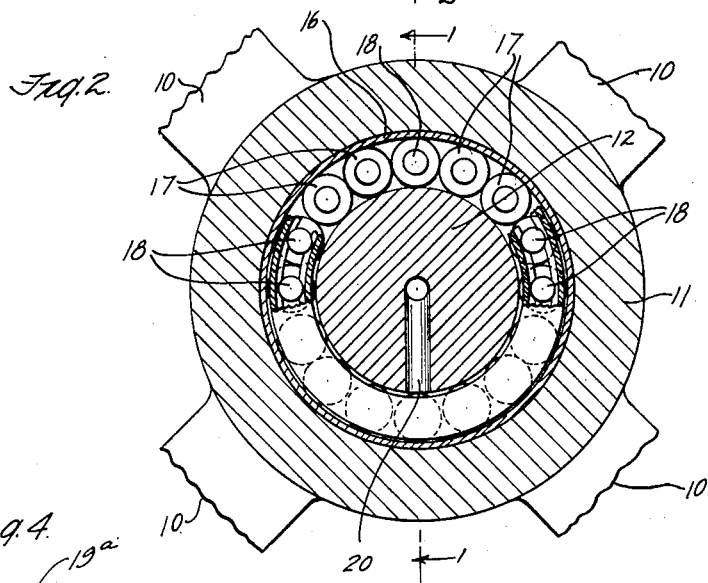
Fig. 2 is a similar view taken substantially on the line 2—2 of Fig. 1.

Referring now to the drawing in detail and particularly to Figs. 1 and 2, there is shown in part a pulley 10 having an outer bearing member or hub 11 provided with a roller bearing and mounted on a short shaft 12 held in suitable supports 13. These supports are disposed on opposite sides of the bearing and act to position the pulley on the shaft. The shaft is provided on one end with a head 14 and this acts with a cotter pin 15 to retain the shaft within the supports.

Within the hub or outer bearing member 11 fits a tubular member 16 which preferably is formed from soft sheet metal by stamping or otherwise. This tubular member is preferably hardened after it is formed and for best results is ground upon its internal and external cylindrical surfaces. The metal in this member may be of thin gauge as it is completely supported in action by the relatively thick outer bearing member or hub 11. Within this tubular member is a set of rolls 17 having a bearing on the inner cylindrical surface thereof. These rolls are of sturdy construction, and their diameter is large as compared with the thickness of the metal of the member 16.

Figure 4:
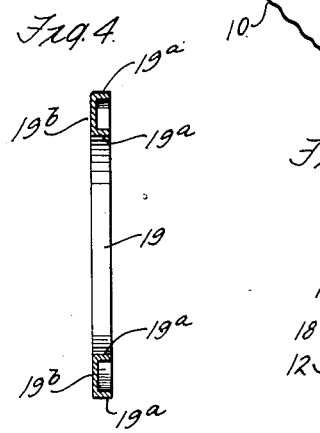
Fig. 4 is a central sectional elevation of a partially formed cage, illustrating one method of initially forming the same.

The rolls 17 are provided with reduced ends 18 tapering inwardly or in other words of smaller diameter at their junction with the cylindrical body of the roll than at the outer end. The corresponding ends of the rolls are held by a cage or clip 19 preferably stamped or otherwise formed from sheet metal. This cage may be initially formed in various ways and shapes but a convenient method is to stamp from sheet metal by means of suitable forming tools an annular channel shaped member such as is illustrated in Fig. 4 in which the annular side walls 19a of the channel are each disposed at substantially a right angle to the end or connecting wall 19b.

The cages thus initially formed may be mounted on the rolls in the following manner:—The set of rolls is held in any convenient manner in proper bearing arrangement and one of the channel shaped cages slipped over each end of such set so that the corresponding ends of the individual rolls rest within the channel. The walls 19a are then bent inwardly by any suitable tools until they are brought into substantially the position indicated in Fig. 1. This provides an interlocking connection between the cages and the set of rolls and the cages thereafter effectually hold the rolls in their proper position. The rolls with attached cages now form a complete unit which may be readily inserted as such into a bearing. The cages permit free rotation of the rolls, and revolution thereof about the axis of the bearing or in other words movement of the rolls longitudinally of the channels in which their ends are held.

After the rolls have been mounted in the cages 19 in the manner described, the unit there formed is readily assembled in a bearing. In the form of the bearing shown in the drawing this may be accomplished as follows:—The tubular member 16 is forced into the hub 11 until these parts are in registration, the unit composed of the rollers and cages is then slid endwise into the bearing, the pulley positioned between the supports 13, the shaft 12 inserted through the supports and rolls and the cotter pin placed in the shaft.

These cages 19 may be of light gauge metal as there is very little if any strain thereon in action. Lubricant may be conducted to the rolls in any convenient manner as for example by a passage 20 leading axially and then radially through the shaft 12.

Figure 3:
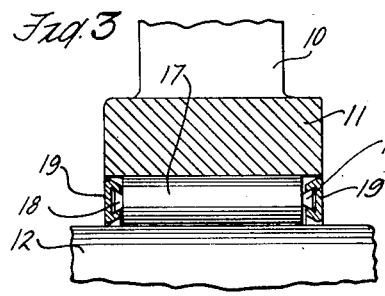
Fig. 3 is a detail sectional elevation of a modification of the device.

In Fig. 3 is shown a modification in which the sheet metal bearing member 16 has been omitted and the rolls 17 act directly between the inner cylindrical surface of the hub 11 and the outer periphery of the shaft 12. The rolls 17 are here supported at their ends by cages 19 as before.

It will thus be seen that there is provided a construction and an art, both of an essentially practical nature, in which the several objects of this invention are obtained.

As many possible embodiments may be made of the mechanical features of the above invention, and as the art herein described might be varied in various parts, all without departing from the scope of the invention, it is to be understood that all matter herein set forth or shown in the accompanying drawing, is to be interpreted as illustrative and not in a limiting sense.

I claim:

1. The herein described art of making an anti-friction bearing which consists in forcing a pair of members of soft sheet metal each into annular channel shape, forming a set of rolls each in general cylindrical form with the end portions diverging from the axes of the rolls, holding the rolls in proper bearing arrangement, placing one of said members over each end of the set of rolls with the corresponding tapering ends of the individual rolls disposed within the annular channel therein and compressing each of the walls of said members inwardly over said end portions to form an interlocking connection between the members and the corresponding ends of the rolls.

2. In construction for anti-friction bearings, in combination, a set of rolls, parts extending from the opposite ends of said rolls, and a pair of circular members having annular channels facing said parts at both ends of said rolls and having walls interlocking with said parts while permitting rotation of said rolls about their axes and about the axes of said members.

3. In construction for anti-friction bearings, in combination, a set of rolls, parts extending from the opposite ends of said rolls along the axes thereof and having a larger diameter substantially at their extremities than at points substantially adjacent the rolls, and a pair of circular members having annular channels facing the ends of said rolls and walls extending over said parts toward the axes of said rolls to interlock with said rolls.

4. In construction for anti-friction bearings, in combination, a set of rolls, pairs of frusto-conical parts extending from the opposite ends of said rolls and having their smaller diameters adjacent the ends of said rolls, and a pair of circular members positioned adjacent the opposite ends of said rolls and interlocking with said parts while permitting rotation of said rolls about their axes.

5. In construction for anti-friction bearings, in combination, a set of rolls, pairs of frusto-conical parts extending from the opposite ends of said rolls and having their smaller diameters adjacent the ends of said rolls, and a pair of circular members having annular channels running in a direction toward the axes of said rolls and disposed at the opposite ends of said rolls, the walls of said members extending inwardly toward the axes of said rolls to interlock with said parts.

6. The herein described art of making an anti-friction bearing which consists in forming channels in a pair of circular metal members so that the channels run substantially parallel to the axes of the members, forming a set of rolls, forming end portions on said rolls having greater diameters at their extremities than at their points of junction with the ends of said rolls, arranging said rolls in the channels of said circular members, and compressing the walls of said circular members inwardly over the surfaces of said end portions.

7. In construction for anti-friction bearings, in combination, a set of rolls having reduced end portions extending from their opposite ends, and a pair of circular members each having an annular channel whose walls incline toward the axes of said rolls about said reduced portions, said members interlocking with said portions.

8. In construction for anti-friction bearings, in combination, a cylinder member, a set of rolls disposed within said cylinder member, said rolls having reduced end portions having larger diameters at their extremities than at the junction between said portions and said rolls, and a pair of circular members having annular channels fitted over said reduced portions, the walls of said circular members being inclined inwardly toward the axes of said rolls.

9. In construction for anti-friction bearings, in combination, a shaft, a set of rolls disposed about said shaft, a cylinder member fitting over said rolls, said rolls having reduced end portions having larger diameters substantially at their extremities than at points substantially adjacent the rolls, and a pair of circular members having annular channels within which said reduced end portions rest, the walls of said channels being inclined inwardly toward the axes of said rolls, said shaft having a passage extending from one end thereof to a point on the circumference thereof adjacent said rolls.

GEORGE G. ROCKWELL.